United States Patent Office 3,459,701
Patented Aug. 5, 1969

3,459,701
CERAMIC FILLED PLASTIC SYSTEM
Huel H. Chandler, Jr., Henry P. Morrell, and Paul G. Sayers, Orange County, Fla., assignors to Martin-Marietta Corporation, Middle River, Md., a corporation of Maryland
No Drawing. Filed Jan. 7, 1964, Ser. No. 336,118
Int. Cl. C08g 45/12; C04b 35/14
U.S. Cl. 260—37                                                13 Claims This invention relates to an improved process for protecting rocket motor launch structures, and to composite refractory ceramic-polymeric products produced by said Efforts have been made in the past to protect rocket motor launch structures from the rocket's exhaust during lift off in order to prevent destruction and costly repairs of the launch mount and umbilical structure after each firing. Various expensive and relatively heavy protective coatings such as neoprene rubber with asbestos fiber, silicone rubber, and concrete have been used by the prior art but they are difficult and costly to apply to the launching structure; they contain relatively small amounts of filler material; they do not adequately resist the corrosive and erosive effects of the exhausts of either solid or liquid fuel propulsion systems; and they are relatively heavy.

The general purpose of the compositions of this invention is to provide a refractory ceramic oxide composition that can be troweled onto vertical surfaces such as rocket launching structures, and to provide a composition that can be modified so that it may be used as a brushable adhesive for cementing one material to another or used as a rocket motor exhaust resistant joint filler. The compositions of this invention greatly reduce the cost of applying high content refractory ceramic oxide-polymeric coatings to surfaces, and especially in applying these coatings to vertical surfaces since the use of costly shaped structures to maintain the coating in place during curing is eliminated, and heat curing is not required since the compositions can be air cured at atmospheric temperature and pressure.

Until recently ceramic coatings were limited to the application of glassy layers on a metal or ceramic base. New developments in processing equipment have made it possible to apply oxide coatings by a flame spray process which requires care in choosing both the oxide coating material and the substrate because the mechanical bond will result in spalling of the coating if there is a significant mismatch in thermal expansion of the materials used. Thus this technique is limited to the less refractory oxides and results in a coating having a porosity of 10 to 20%.

The advent of the plasma torch has made possible melt coatings of even the most refractory oxides. However, acceptable bond strengths have not heretofore been obtained unless the base material has been sand blasted or etched. The porosity of oxide coatings is related to the starting oxide material and they generally have a porosity of about 5%. Such coatings are limited in respect to their use in corrosion protection by their inherent porosity.

Present coating processes using ceramic oxide materials are usually expensive. A further disadvantage of such ceramic oxide coatings lies in their relative brittleness.

The ceramic oxide polymer coating process of this invention is relatively inexpensive, the coatings are relatively flexible and the coating compositions are thixotropic.

An important object of this invention is to provide a high ceramic oxide content plastic system that will withstand the corrosive and erosive effects encountered during rocket launchings.

Another important object of this invention is to provide an improved process for protecting surfaces subject to severe conditions of heat, mechanical stress and chemical attack.

Another important object of this invention is to provide a composition that can be trowled onto a vertical surface without run off.

Another important object of this invention is to provide an ablative coating that maintains its insulative and structural strength at high and low temperatures.

It is another important object of this invention to provide a high ceramic oxide content plastic system having thixotropic properties.

Other objects and features of the invention will become apparent from the more detailed description taken in connection with the illustrative examples and the most novel features will be particularly pointed out hereinafter in connection with the appended claims.

We have now discovered that compositions comprising 47 to 73% fused silica (silica glass) or, certain other fused ceramic oxides, described below, a thixotropic agent, an epoxy resin and a polyamide provide excellent resistance to chemical and mechanical attack under the severe conditions encountered during rocket launchings. The coating comopsitions of this invention when used on a launch mount can withstand stagnation temperatures up to 5000° F., stagnation pressures up to 650 p.s.i., supersonic impingement of solid abrasive particles, severe acoustical stress, severe temperature changes; they have negligible absorption and are corrosively resistant to the fuels and oxidizers of rocket engines such as nitric acid and nitrogen tetroxide.

The primary ingredient in our composition is preferably fused silica or silica glass, which is a ceramic refractory material having a high fusion point, a high melt viscosity, relatively low chemical reactivity from ambient to very high temperatures, a high resistance to heat shock, one of the lowest known coefficients of thermal expansion, low thermal conductivity, and reflectance in particle form which greatly increases the rate of heat reradiation.

Fused silica customarily is made from clean, pure sand that is 99.94% pure $SiO_2$, this pure sand is washed to remove surface impurities, then fused by dropping it through a carbon arc, solidified and ground to size. Ordinary crystalline sand cannot be used in the compositions of this invention because under the conditions of use, sand will pass through a variety of crystalline inversions accompanied by excessive volume changes which will cause the coating to spall from the launch structure.

Preferably two distinct essentially spherical particle sizes of fused silica or certain other fused ceramic oxides are incorporated into the mixture in definite proportions. The coarse grain fused silica, or fused ceramic oxide, component should preferably be "—50+100 mesh" which means that all of it will pass through a standard 50 mesh sieve and remain on a 100 mesh sieve. The fine grain fused silica component should all pass through a 325 mesh screen.

More fused refractory ceramic oxide may be incorporated in the coating compositions of this invention if there are both large grain particles and small grain particles. The more fused ceramic oxide contained in the coating, the greater the heat insulation and the corrosion protection of the coating.

While fused silica has superior erosion resistance, lower thermal expansion and higher melt viscosity than other fused ceramic oxides, the properties of other fused ceramic oxides may be more desirable for other specific uses. For example fused alumina will absorb infra red radiation, while fused silica, being transparent will transmit or reflect infra red. Therefore, when infra red radiation is an important factor, fused alumina may be preferred.

An important consideration in picking materials having a high thermal stress resistance is the possible presence of crystalline inversions accompanied by excessive volume changes. Unlike ordinary crystalline silica which undergoes several such polymorphic changes and is relatively useless as a result, zirconium oxide may be modified (by addition of calcia) to prevent such inversions and in the modified form it is an excellent, stable, high temperature material.

Other high purity fused refractory ceramic oxide materials such as fused magnesia, fused alumina, fused zirconia, and the like can be used in place of part or all of the fused silica. An important consideration in choosing a refractory ceramic oxide is that it have a melting point above 2700° F., and preferably above 2900° F.

An important disadvantage of a protective coating containing only a refractory ceramic oxide is the inability of the ceramic material to relieve stress by plastic deformation. Ceramics are known for their brittleness, or lack of ductility. The inability of the ceramic materials to relieve stress by plastic deformation becomes critical under the combined factors of thermal stress, mechanical stress and stress concentrations due to design and nature of the material. By dispersing the ceramic material along with a thixotropic agent in the epoxy resin and the polyamide resin the above disadvantages are overcome. The coating compositions of this invention are no longer brittle and they are capable of plastic deformation.

The preferred thixotropic ingredient is an asbestos type fibrous material in the form of a talc and is known as Asbestine, which is hydrous magnesium silicate, produced by the International Talc Company of New York, N.Y. Other materials, in fibrous or powdered form, such as potassium titanate, zirconia, Wollastonite, magnesia, asbestos and the like may also be used. The interaction of the thixotropic agent with the essentially spherical silica particles cause the composition to exhibit the important property of having decreasing viscosity with increasing shear stress. These thixotropic agents are high bulk fillers that serve to improve the spreading characteristics of the composition, by making the composition trowelable and serve to furnish non-sag, non-flow properties to the mixture through intermingling of the coarse and fine grain size siliica particles to prevent the compound from flowing off the structure to which it is applied.

Any talc or thixotropic agent would function in the thixotropic role, but the preferred fibrous talc or fibrous thixotropic agent serves an important additional function by reinforcing the char formed when the composition of this invention is exposed to flame temperatures thereby greatly reducing spalling.

The composition of this invention may be used without adding a thixotropic agent. However, the composition of fused refractory ceramic, epoxy resin and polyamide resin will not have the flow properties imparted by the thixotropic agents nor the advantages flowing therefrom.

A preferred weight ratio of solids is 57 parts coarse fused silica, 28 parts fine fused silica, and 15 parts fibrous talc. However, a weight ratio range of 40 to 65 parts coarse fused silica, 12 to 28 parts fine fused silica, and 5 to 16 parts thixotropic material will produce good results.

The weight ratio of coarse to fine solid materials is important from the standpoint of achieving a maximum fused ceramic oxide density in these compositions. We stress once again that the more fused ceramic material in the composition the better the insulating and corrosion properties of the coating. To illustrate the increased density obtained by using both a large grain size and a small grain size fused ceramic oxide, one could consider the analogy of the coarse grains being mature potatoes and the fine grains being the much smaller "new" potatoes. After a bushel is full of mature potatoes one could still add a sizeable amount of the much smaller marble-sized potatoes down between the mature potatoes to increase the density of the resultant mixture.

The epoxy resin component reacts with the polyamide resin component to copolymerize at room temperature, the mixture is self-hardening, non-volatile, has low toxicity, is relatively inexpensive, has excellent handling properties, serves to bind and adhere the solid components to a vertcal surface so that the material will remain in place wtihout the use of forms or supports until natural adhesion promotes a strong bond, and the copolymer formed is resistant to chemical and mechanical attack.

Epoxy resins are known to be excellent adhesives, and the polyamides are known to act as catalysts in the copolymerization reaction. However to achieve the desired workability in the mixture and to obtain a viscosity such that the solids will not separate out during transportation and storage, our tests indicate that the epoxy to polyamide ratio should be approximately 7 to 8 by weight.

Any thermosetting epoxy resin and any thermoplastic polyamide resin may be copolymerized as long as the mixture has the desired workability and adhesiveness. Thermosetting epoxy resins containing reactive epoxy groups in terminal locations, such as those commercially made by reacting epichlorohydrin with bisphenol A in the presence of excess caustic is a preferred commercial epoxy resin, and a thermoplastic resin formed as a condensation product of dimerized or trimerized vegetable oil, unsaurated fatty acids, and aryl or alky polyamines are the preferred commercial polyamides used in Examples 1 to 3. Such copolymers are well known and a great number of other epoxy resins and polyamide resins that may be used in place of the commercially available resins cited above.

The ratio of resin to solids preferably used for troweling is 30 parts resin, 70 parts solid, but for pneumatic placement the proportion may be 35/65 and this may be made a little thinner for brush application. Generally a resin to solids ratio of 25 to 35 parts resin to 60 to 75 parts solid material will produce good results. This means adding between 10 to 20% by weight by epoxy resin and 10 to 20% by weight of polyamide resin to the solid components.

With the foregoing general discussion in mind, the following examples will further illustrate the invention. Variations can be made in the various proportions and ingredients illustrated. Therefore the example are not to be taken as coextensive with the invention in its broadest aspects. In the examples the fibrous talc is the Asbestine described above and the percentages are percentages by weight.

Example 1

| Fused silica: | Percent |
| --- | --- |
| Coarse (−50+100 mesh) | 41 |
| Fine (−325 mesh) | 18 |
| Fibrous talc (44 micron) | 11 |
| Epoxy resin | 14 |
| Polyamide resin | 16 |
| | 100 |

This formulation is a general purpose trowelable mixture that can be packaged as two components, one containing the epoxy resin and the other the polyamide resin, which are mixed in appropriate proportions and applied to any surface, such as iron, steel, aluminum, and the like, that will be subject to high temperatures and chemical corrosion.

Example 2

Fused silica: Percent
- Coarse (−50+100 mesh) —— 58
- Fine (−325 mesh) —— 12

Fibrous talc —— 5
Epoxy resin —— 15
Polyamide resin —— 10

Total: 100

This formulation may be rammed onto any surface subject to mechanical abrasion or stress.

Example 3

Fused silica: Percent
- Coarse (−50+100 mesh) —— 40
- Fine (−325 mesh) —— 25

Fibrous talc (44 microns) —— 12
Epoxy resin —— 12
Polyamide resin —— 11

Total: 100

This formulation is a trowelable mixture designed for vertical surfaces; it does not slump or run off the surface being protected. This formulation may be used to protect geometric forms such as elbows, angles, bends, and the like.

Example 4

Fused silica: Percent
- Coarse (−50+100 mesh) —— 40–58
- Fine (−325 mesh) —— 12–25

Fibrous thixotropic material —— 5–16
Epoxy resin —— 10–17
Polyamide resin —— 10–17

The composition percentage range illustrated in Example 4 is the composition range that produces the best combination of heat insulation, chemical resistance and adhesive adherence.

The composition of this invention, illustrated by Example 1 was subject to simulated launch environments by using a subscale rocket test motor having the following parameters:

- Thrust —— 1000 pounds.
- Burn time —— 10 seconds.
- Chamber pressure —— 600 p.s.i.
- Expansion ratio —— 6.
- Propellant —— UTC 3001.
- Grain configuration —— End burning.
- Motor type —— Rechargeable.

To simulate lift off conditions, a track drive gantry was used which moved the test specimen upward in the blast stream at a predetermined rate. Each test specimen was equipped with several thermocouples, and the motor was instrumented to determine burning time, chamber pressure and thrust. Following each test, specimens were evaluated in comparison with typical prior art protective coatings on the basis of weight loss, erosion or build-up by a series of profilometer traces and visual observations. The comparative results of these tests are listed in Table 1.

TABLE 1.—COMPARATIVE BLAST EROSION DATA

| | Maximum erosion (percent) | Backface temperature (° F.) | Spalling (visual) |
|---|---|---|---|
| Filled phenolic (Insulation Technology) | 29.8 | 95 | None. |
| Silicone rubber (Dow Q2-0103) | 11.2 | 100 | Do. |
| Blastoment concrete (Johns-Manville) | 36.2 | 10 | |
| Volca-Crete contrete (Volca-Crete Corp.) | 35.2 | 80 | Slight. |
| Concrete (Gunite Co.) | 43.6 | 80 | Heavy. |
| All purpose mixture Example 1) | 4.5 | 80 | Very slight. |

Table 2 lists various properties of the composition illustrated by Example 1.

TABLE 2

| Property: | Value |
|---|---|
| Tensile yield strength —— p.s.i | 2,460 |
| Tensile ultimate strength —— p.s.i | 2,460 |
| Tensile elongation —— percent | 1.2 |
| Tensile modulus —— p.s.i | 270,000 |
| Compressive yield strength —— p.s.i | 12,400 |
| Compressive ultimate strength —— p.s.i | 11,400 |
| Compressive modulus —— p.s.i | 710,000 |
| Flexural strength —— p.s.i | 5,260 |
| Flexural modulus —— p.s.i | 2,350,000 |
| Dielectric strength —— volts/mil | 255 |
| Dissipation factor, $10^{10}$ —— c.p.s | 0.005 |
| Dielectric constant, $10^{10}$ —— c.p.s | 3.3 |
| Hardness —— Rockwell "B" | 53 |
| Lap shear —— p.s.i | 1,700 |
| Density —— lb./ft.$^3$ | 106 |
| Water absorption —— percent | 1.7 |

The values presented in Table 2 are averages taken from a test program in the Materials Laboratory of the Orlando Division of the Martin-Marietta Company. The spread of raw data for each test was small signifying homogeneity of the test material.

Further tests illustrated that a piece of ¼-inch thick aluminum, coated with a ⅜-inch thick layer of the composition illustrated in Example 1, was not damaked by five cycles of immersion in water at 200° F., followed by immersion in liquid nitrogen at −320° F. There were no injurious effects. A similar test was run with the same materials varying the temperature between 0° F. and −423° F. (liquid hydrogen). Again there were no injurious effects. This indicates that the compositions of this invention withstand rapid changes in temperature in both the high temperature range and the low temperature range. This is a valuable property from the standpoint of launching rockets from positions in space where low temperatures may exist; for example, in launching a rocket from the moon where temperatures drop to below −100° F. At the low temperatures encountered in space the protective compositions of this invention will still have structural strength and will resist expanding and contacting which cause other materials to fracture.

From a practical commercial standpoint the compositions of this invention are lower in cost than other comparable ablative materials; they are easier to use; they can be made free flowing or non-sagging; they adhere to any clean surface without requiring a primer or supplementary adhesive; they cure at ambient temperatures in less than 12 hours; and they are versatile in that they can be used on launch pads, in jet engines, as a radome, for bunker reinforcement, and to obtain better steel structure fire protection.

After reading the foregoing detailed description, it will be seen that the objects set forth at the outset of this specification have been successfully achieved. It is apparent that variations may be made in the illustrative details of this invention without departing from the spirit of the invention or the scope thereof as defined in the appended claims.

What is claimed is:

1. A process for protecting rocket launching structures against the corrosive and erosive effects caused by a rocket's exhaust during lift off which comprises coating the launching structures with a thixotropic thickly spreadable ceramic coating composition containing about 40 to 65 parts of coarse solid fused silica particles, about 12 to 28 parts of fine solid fused silica particles, about 5 to 16 parts of solid thixotropic material, and, as a self-curing resin binder for said silica particles the thixotropic materials, a reactive mixture of an epoxy resin containing epoxy groups in terminal locations with a polyamide resin formed by condensing long chain polyvalent aliphatic carboxylic acids and polyamines; said ceramic coating composition containing about 60 to 75 parts solids and about 25 to 40 parts of said reactive mixture.

2. A thermally protective and chemically resistant ceramic coating composition comprising about 40 to 65 parts of coarse solid fused silica particles, about 12 to 28 parts of fine solid fused silica particles, about 5 to 16 parts of a solid thixotropic material, and a binder resin for said silica particles and thixotropic materials, comprising the reaction product of a reactive mixture of an epoxy resin containing reactive epoxy groups in terminal locations with a polyamide resin formed by condensing long chain polyvalent aliphatic carboxylic acids and polyamines; said ceramic coating containing about 60 to 75 parts solids and about 25 to 40 parts of said binder resin and said composition being thixotropic and spreadable in thick layers prior to the formation of said reaction product and said reactive mixture being self curing.

3. The composition of claim 2 containing 10 to 20 parts polyamide resin in the reactive mixture thereof.

4. The composition of claim 2 containing 52 to 73 parts of fused silica.

5. The composition of claim 2, wherein said fused silica consists of a mixture of a coarse fused silica having a particle size between $-50+100$ mesh, and a fine fused silica having a particle size of $-325$ mesh.

6. The composition of claim 2, wherein said thixotropic material is in fibrous form.

7. The composition of claim 6, wherein said thixotropic material is fibrous hydrous magnesium silicate.

8. The composition of claim 2, wherein the weight ratio of epoxy resin to polyamide resin is 7 to 8.

9. The composition of claim 2, wherein said epoxy resin is a thermosetting resin containing reactive epoxy groups in terminal locations, and the polyamide resin is a thermoplastic resin formed as the condensation product of a vegetable oil, unsaturated fatty acid and a polyamine.

10. The composition of claim 2 comprising 40 to 50% by weight coarse fused silica, 12 to 25% by weight fine fused silica, 5 to 16% by weight fibrous thixotropic material, and a binder comprising 10 to 17% by weight epoxy resin and 10 to 17% by weight polyamide resin.

11. The process of claim 1, wherein said structure is a vertical one.

12. The process of claim 1, wherein said fused refractory ceramic oxide has a melting point about 2700° F.

13. The composition of claim 1, wherein said epoxy resin is a reaction product of epichlorohydrin and bisphenol A.

References Cited

UNITED STATES PATENTS

| | | | |
|---|---|---|---|
| 2,990,383 | 6/1961 | Glaser | 260—37 |
| 3,007,888 | 11/1961 | Mack et al. | 260—37 |
| 3,014,410 | 12/1961 | Anderson | 89—1.7 |
| 3,015,991 | 1/1962 | Forbes | 89—1.7 |
| 3,044,900 | 7/1962 | Ford | 260—18 |
| 3,052,090 | 9/1962 | Herzog | 60—35.6 |
| 3,124,542 | 3/1964 | Kohn | 60—35.6 |
| 3,145,000 | 8/1964 | Mackie | 102—92.5 |
| 3,210,233 | 10/1965 | Klummer et al. | 102—92.5 |

FOREIGN PATENTS 629,028 8/1963 Belgium.

OTHER REFERENCES

R. F. Zemer: S.A.E. Journal, vol. 70, No. 6, June 1962, pp. 70–73.

MORRIS LIEBMAN, Primary Examiner

J. E. CALLAGHAN, Assistant Examiner

U.S. Cl. X.R.

260—18